US012745240B2

(12) United States Patent
Xu et al.

(10) Patent No.: US 12,745,240 B2
(45) Date of Patent: Sep. 22, 2026

(54) CONFIGURED GRANT (CG) OCCASION IDENTIFIERS FOR OVERLAPPING CG OCCASIONS

(71) Applicant: QUALCOMM Incorporated, San Diego, CA (US)

(72) Inventors: Huilin Xu, Temecula, CA (US); Diana Maamari, San Diego, CA (US); Ahmed Elshafie, San Diego, CA (US); Iyab Issam Sakhnini, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 18/194,538

(22) Filed: Mar. 31, 2023

(65) Prior Publication Data

US 2024/0334427 A1 Oct. 3, 2024

(51) Int. Cl.
*H04W 72/12* (2023.01)
*H04W 72/1268* (2023.01)

(52) U.S. Cl.
CPC ............................... *H04W 72/1268* (2013.01)

(58) Field of Classification Search
CPC ................................................ H04W 72/1268
See application file for complete search history.

(56) References Cited

U.S. PATENT DOCUMENTS

2022/0174722 A1* 6/2022 Talarico .............. H04W 74/002
2022/0377785 A1* 11/2022 Yao .......................... H04L 1/08
2025/0039883 A1* 1/2025 Fu ......................... H04W 72/04
2025/0324427 A1* 10/2025 Zeng .................... H04L 5/0053

* cited by examiner

*Primary Examiner* — Marcus Smith
*Assistant Examiner* — Zhaohui Yang
(74) *Attorney, Agent, or Firm* — QUALCOMM Incorporated

(57) ABSTRACT

Various aspects of the present disclosure generally relate to wireless communication. In some aspects, a user equipment (UE) may generate a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time. The UE may transmit the message. Numerous other aspects are described.

21 Claims, 13 Drawing Sheets

100
Communication Manager 140
Communication Manager 150
Network controller
130
to/from NNs
Macro Cell
UE
120a
120e
UE
Aggregated Architecture
NN
Disaggregated Architecture
NN
NN
NN
Network node(s) (NNs)
110a
102a
110d
Relay NN
120d
UE
102b
110b
NN
120b
102c
110c
NN
120c

600

900

CONFIGURED GRANT (CG) OCCASION IDENTIFIERS FOR OVERLAPPING CG OCCASIONS

FIELD OF THE DISCLOSURE

Aspects of the present disclosure generally relate to wireless communication and to techniques and apparatuses for indicating configured grant uplink control information skipping bits.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include generating a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time. The method may include transmitting the message.

Some aspects described herein relate to a method of wireless communication performed by a network entity. The method may include receiving a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The method may include adjusting communications based at least in part on the one or more unused CG-PUSCH occasions and the one or more not unused CG-PUSCH occasions indicated by the message.

Some aspects described herein relate to a UE for wireless communication. The UE may include a memory and one or more processors coupled to the memory. The one or more processors may be configured to generate a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The one or more processors may be configured to transmit the message.

Some aspects described herein relate to a network entity for wireless communication. The network entity may include a memory and one or more processors coupled to the memory. The one or more processors may be configured to receive a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The one or more processors may be configured to adjust communications based at least in part on the one or more unused CG-PUSCH occasions and the one or more not unused CG-PUSCH occasions indicated by the message.

Some aspects described herein relate to a non-transitory computer-readable medium that stores a set of instructions for wireless communication by a UE. The set of instructions, when executed by one or more processors of the UE, may cause the UE to generate a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The set of instructions, when executed by one or more processors of the UE, may cause the UE to transmit the message.

Some aspects described herein relate to a non-transitory computer-readable medium that stores a set of instructions for wireless communication by a network entity. The set of instructions, when executed by one or more processors of the network entity, may cause the network entity to receive a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The set of instructions, when executed by one or more processors of the network entity, may cause the network entity to adjust communications based at least in part on the one or more unused CG-PUSCH occasions and the one or more not unused CG-PUSCH occasions indicated by the message.

Some aspects described herein relate to an apparatus for wireless communication. The apparatus may include means for generating a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The apparatus may include means for transmitting the message.

Some aspects described herein relate to an apparatus for wireless communication. The apparatus may include means for receiving a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The apparatus may include means for adjusting communications based at least in part on the one or more unused CG-PUSCH occasions and the one or more not unused CG-PUSCH occasions indicated by the message.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
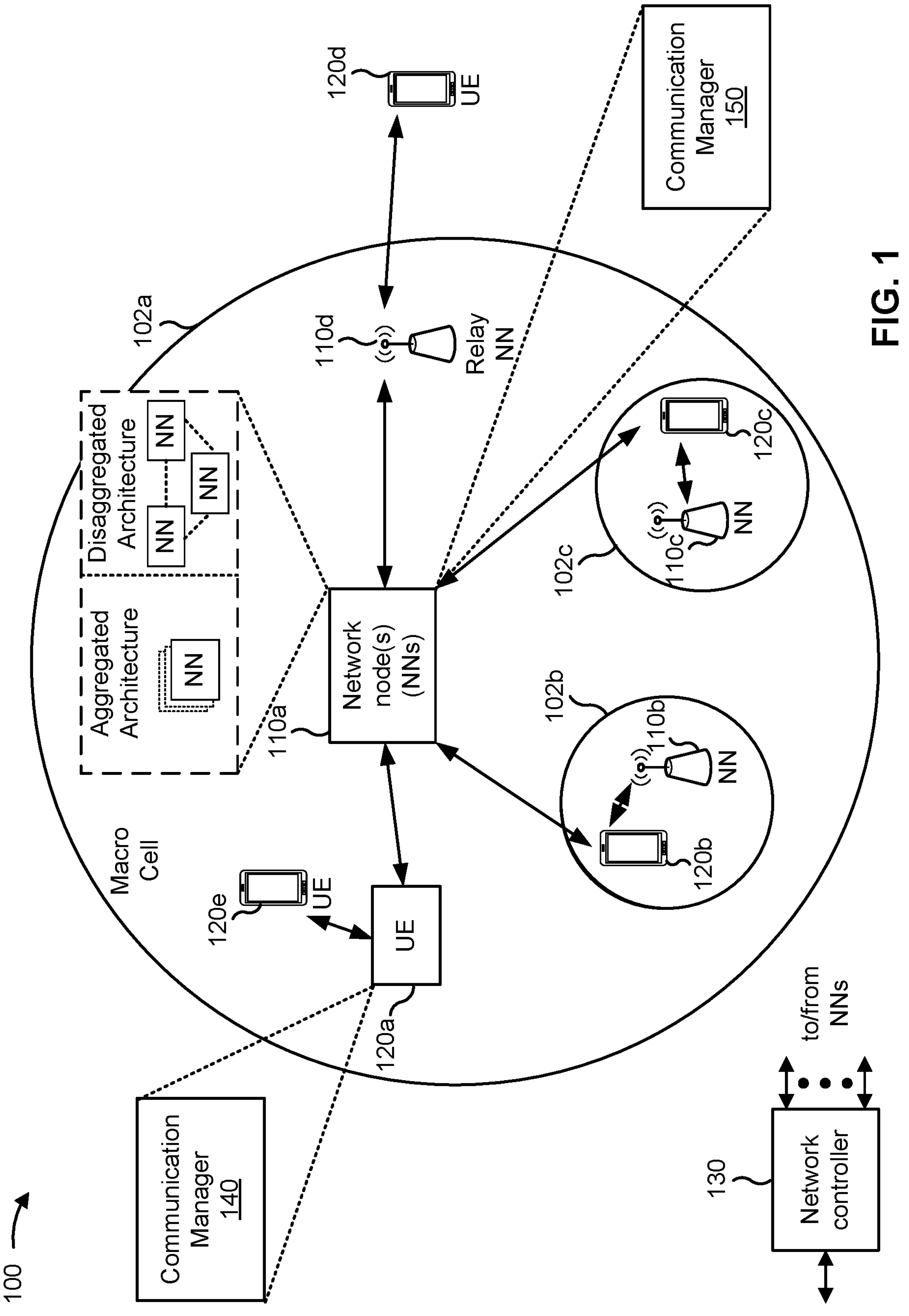
FIG. 1 is a diagram illustrating an example of a wireless network, in accordance with the present disclosure.

Resources for uplink communications by a user equipment (UE) may be granted according to a configuration. Such a resource may be referred to as a "configured grant" (CG). For example, CG communications may include periodic uplink communications that are configured for a UE, such that a network entity does not need to send separate downlink control information (DCI) to schedule each uplink communication, thereby conserving signaling overhead.

With CG scheduling, resource allocation may be large, resource utilization may be high, interference in the uplink may increase, and power consumption may be higher. In some aspects, the UE may skip one or more CGs to conserve power. If one or more CGs are skipped, the UE may indicate, in uplink control information (UCI), the one or more CGs that are skipped. CG physical uplink shared channel (PUSCH) occasions (also referred to herein as just "CG occasions") that are skipped may be considered to be "unused." CG occasions that are not skipped and can be used are considered to be "not unused."

A CG period may comprise multiple CG occasions, where each CG occasion occurs at a configured time location (e.g., time slot) in the CG period. If multiple CG occasions indicated by the same UCI are not overlapping in the time domain, it is straightforward that the occasion identifier (ID) is determined by the time slot of the CG occasion in the CG period. However, in some scenarios, CG occasions can overlap in time. If multiple CG occasions can overlap in a time slot, it is not clear how a UE is to report the CG occasion ID selected for each time slot.

According to various aspects described herein, a UE may generate and transmit a message (e.g., UCI) that indicates, with one or more CG occasion IDs, one or more unused CG occasions and one or more not unused CG-PUSCH occasions. Each respective CG occasion ID of the one or more CG occasion IDs may be associated with a respective time slot in which multiple CG-PUSCH occasions overlap in time. That is, the message may indicate, for each time slot of multiple time slots of a CG period, which CG occasion is selected among multiple CG occasions in a respective time slot. In some aspects, the CG occasion ID may be defined or assigned to a CG occasion according to a rule. For example, a CG occasion with an earlier starting symbol may have a lower CG occasion ID, or a CG occasion with an earlier end symbol may have a lower CG occasion ID. By specifying how CG occasion IDs are defined and/or reported for CG occasions that overlap in time, a UE may communicate unused and not unused resources to a network entity, and signaling resources will be conserved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may generate a message that indicates, with one or more configured grant (CG) occasion IDs, one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time. The communication manager 140 may transmit the message. Additionally, or alternatively, the communication manager 140 may perform one or more other operations described herein.

In some aspects, a network entity (e.g., network node 110) may include a communication manager 150. As described in more detail elsewhere herein, the communication manager 150 may receive a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The communication manager 150 may adjust communications based at least in part on the one or more unused CG-PUSCH occasions and the one or more not unused CG-PUSCH occasions indicated by the message. Additionally, or alternatively, the communication manager 150 may perform one or more other operations described herein.

As indicated above, FIG. 1 is provided as an example. Other examples may differ from what is described with regard to FIG. 1.

Figure 2:
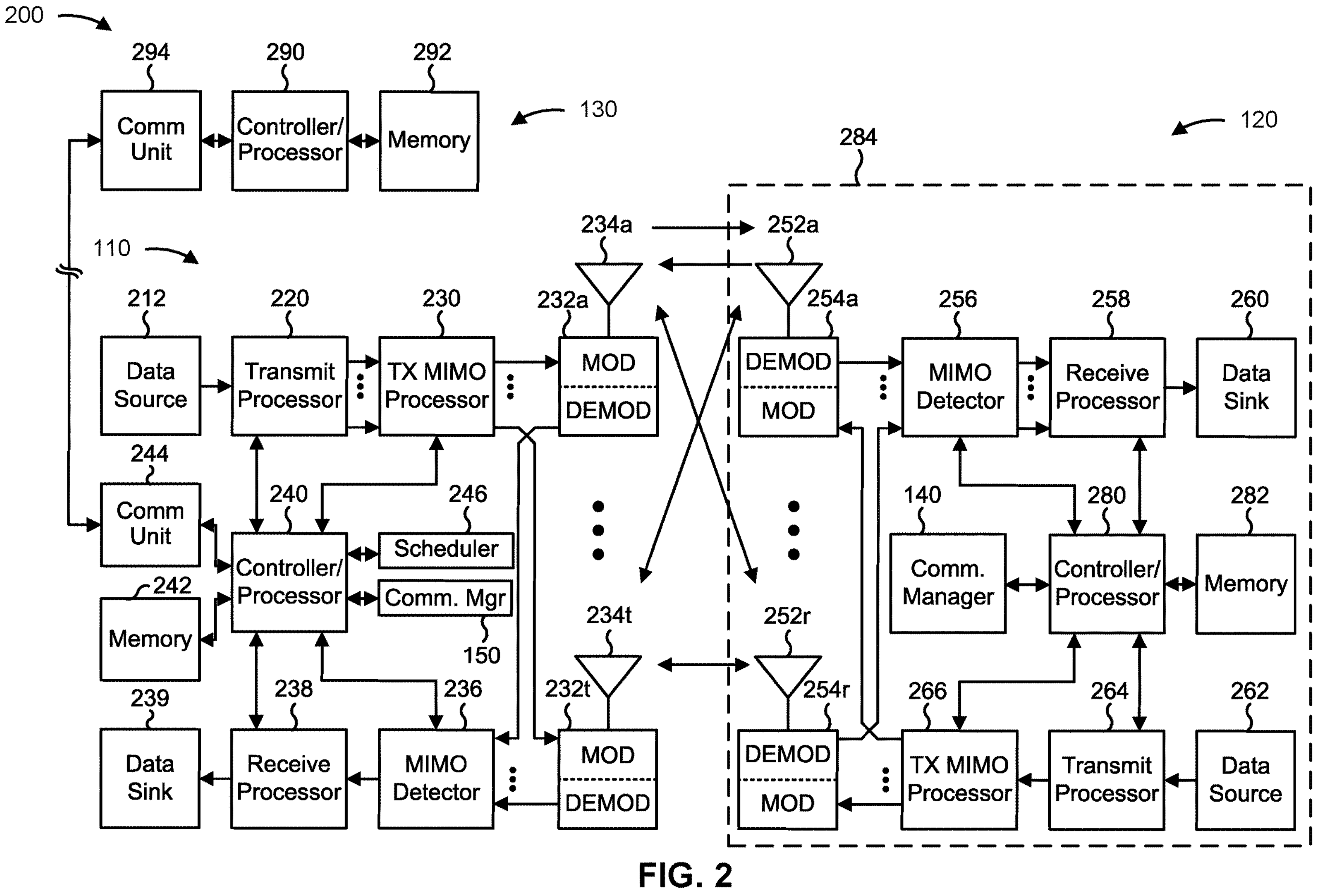
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 2-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 2-12).

A controller/processor of a network entity (e.g., controller/processor 240 of the network node 110), the controller/processor 280 of the UE 120, and/or any other component(s) of FIG. 2 may perform one or more techniques associated with indicated unused and not unused CG occasions for overlapping CG occasions, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for generating a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time; and/or means for transmitting the message. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., network node 110) includes means for receiving a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time; and/or means for adjusting communications based at least in part on the one or more unused CG-PUSCH occasions and the one or more not unused CG-PUSCH occasions indicated by the message. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, May be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
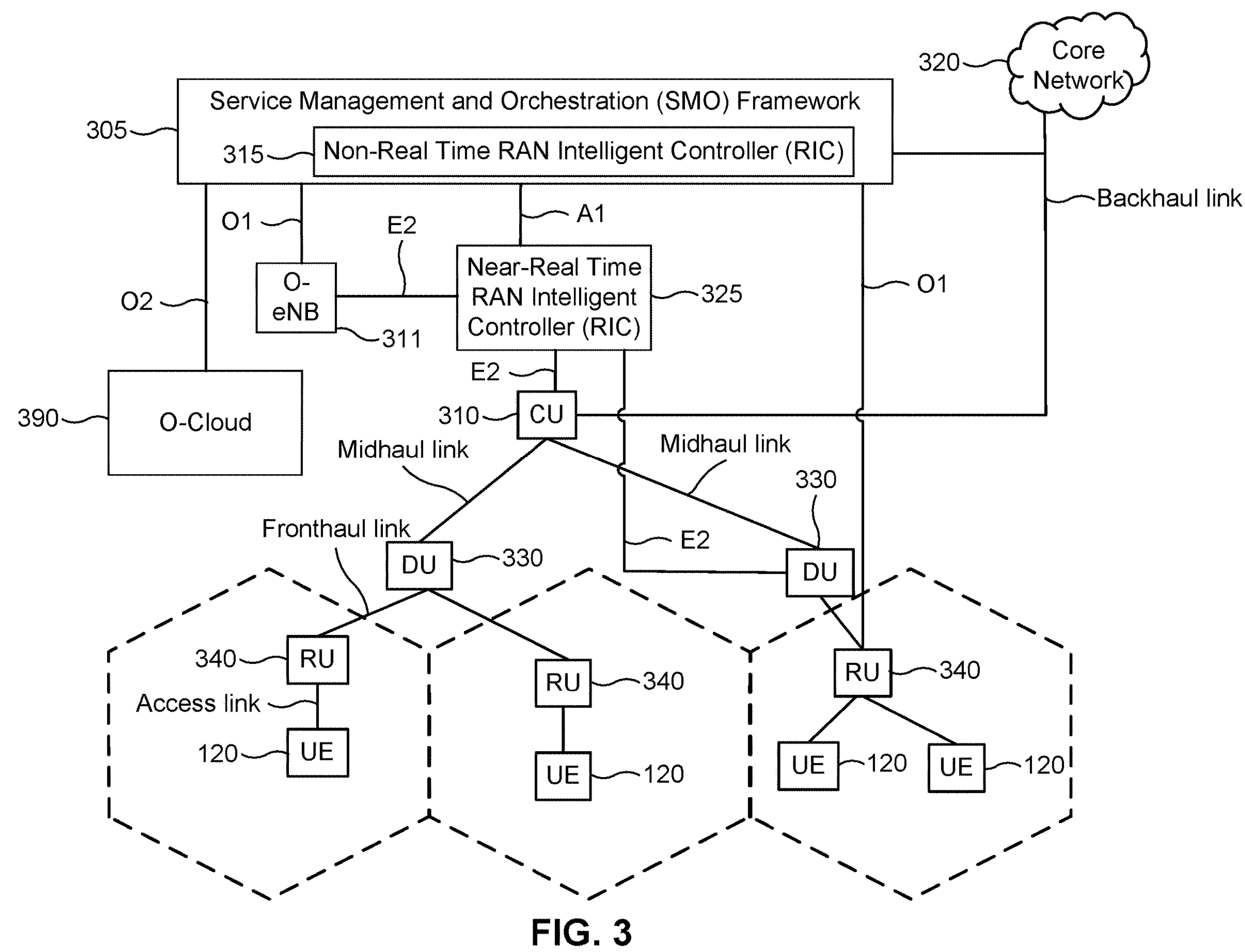
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
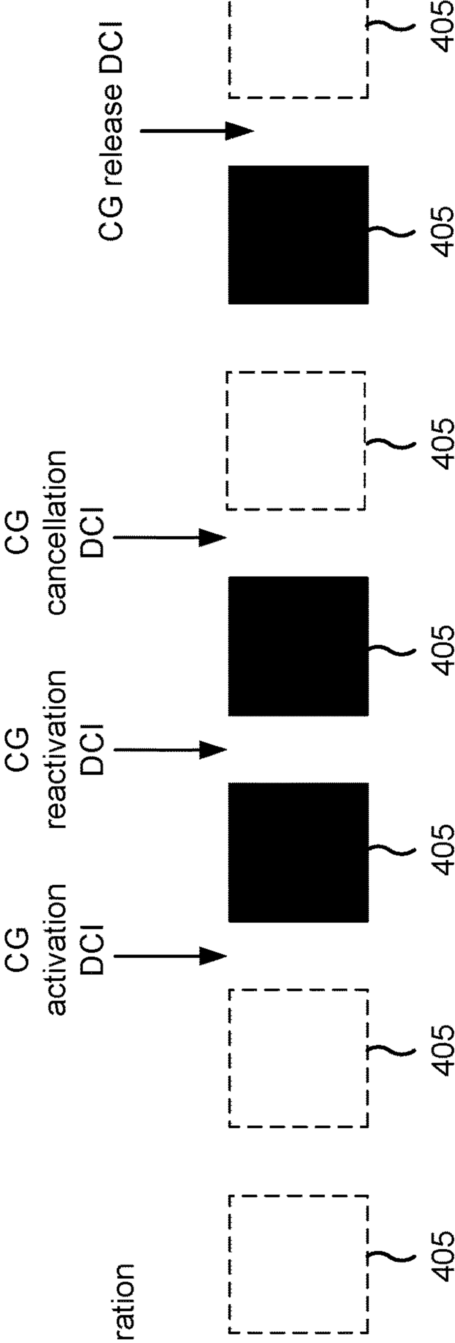
FIG. 4 is a diagram illustrating an example of uplink configured grant (CG) communication, in accordance with the present disclosure.

FIG. 4 is a diagram illustrating an example 400 of uplink CG communication, in accordance with the present disclosure.

In some aspects, physical resource blocks (PRBs) for uplink communications may be granted dynamically, such as with a scheduling request (SR) or a buffer status report (BSR). A UE may first transmit an SR on a physical uplink control channel (PUCCH), requesting radio resources in the uplink when the UE has pending data in its buffer. With periodic BSR reporting, the network entity knows the available buffer at the UE. The network entity then transmits an uplink grant DCI. The allocated resources are specified in the DCI for the UE to transmit a communication on the PUSCH.

Alternatively, PRBs for uplink communications may be granted according to a configuration. For example, CG communications may include periodic uplink communications that are configured for a UE, such that the network entity does not need to send separate DCI to schedule each uplink communication, thereby conserving signaling overhead.

As shown in example 400, a UE (e.g., UE 120) may be configured with a CG configuration for CG communications. For example, the UE may receive the CG configuration via an RRC message transmitted by a network entity (e.g., a network node 110). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 405 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network entity may additionally transmit CG activation DCI to the UE to activate the CG configuration for the UE (e.g., for a Type 2 CG configuration). The network entity may indicate, in the CG activation DCI, communication parameters, such as an MCS, an RB allocation, and/or antenna ports, for the CG-PUSCH communications to be transmitted in the scheduled CG occasions 405. The UE may begin transmitting in the CG occasions 405 based at least in part on receiving the CG activation DCI. For example, beginning with a next scheduled CG occasion 405 subsequent to receiving the CG activation DCI, the UE may transmit a PUSCH communication in the scheduled CG occasions 405 using the communication parameters indicated in the CG activation DCI. The UE may refrain from transmitting in configured CG occasions 405 prior to receiving the CG activation DCI.

The network entity may transmit CG reactivation DCI to the UE to change the communication parameters for the CG-PUSCH communications. Based at least in part on receiving the CG reactivation DCI, and the UE may begin transmitting in the scheduled CG occasions 405 using the communication parameters indicated in the CG reactivation DCI. For example, beginning with a next scheduled CG occasion 405 subsequent to receiving the CG reactivation DCI, the UE may transmit PUSCH communications in the scheduled CG occasions 405 based at least in part on the communication parameters indicated in the CG reactivation DCI.

In some cases, such as when the network entity needs to override a scheduled CG communication for a higher priority communication, the network entity may transmit CG cancellation DCI to the UE to temporarily cancel or deactivate one or more subsequent CG occasions 405 for the UE. The CG cancellation DCI may deactivate only a subsequent one CG occasion 405 or a subsequent N CG occasions 405 (where N is an integer). CG occasions 405 after the one or more (e.g., N) CG occasions 405 subsequent to the CG cancellation DCI may remain activated. Based at least in part on receiving the CG cancellation DCI, the UE may refrain from transmitting in the one or more (e.g., N) CG occasions 405 subsequent to receiving the CG cancellation DCI. As shown in example 400, the CG cancellation DCI cancels one subsequent CG occasion 405 for the UE. After the CG occasion 405 (or N CG occasions) subsequent to receiving the CG cancellation DCI, the UE may automatically resume transmission in the scheduled CG occasions 405.

The network entity may transmit CG release DCI to the UE to deactivate the CG configuration for the UE. The UE may stop transmitting in the scheduled CG occasions 405 based at least in part on receiving the CG release DCI. For example, the UE may refrain from transmitting in any scheduled CG occasions 405 until another CG activation DCI is received from the network entity. Whereas the CG cancellation DCI may deactivate only a subsequent one CG occasion 405 or a subsequent N CG occasions 405, the CG release DCI deactivates all subsequent CG occasions 405 for a given CG configuration for the UE until the given CG configuration is activated again by a new CG activation DCI.

With dynamic grants, RB allocation in the uplink may match the information bits of a communication and thus use less power. However, transmitting an SR and waiting for an uplink grant increases latency. With CG, RB allocation might be more than what is needed for the UE information bits and more power may be consumed than necessary. The UE will have to pad the information bits such that all the allocated resources to the UE are used. If the UE has fewer information bits, the UE may still be required to transmit over the allocation resources.

With CG scheduling, resource allocation may be large, resource utilization may be high, interference in the uplink may increase, and power consumption may be higher. The higher power consumption may increase the thermal properties of the UE, which may be an important issue for extended reality (XR) devices or augmented reality (AR) devices.

In some aspects, a UE may skip or ignore a communication associated with a grant, whether a dynamic grant or a CG. Otherwise, the UE transmits padded bits over the allocated resources (e.g., RBs), even though the information bits may not require the allocated number of RBs for transmission. The allocated number of RBs may be an overallocation. For example, the UE may receive a configuration (e.g., via RRC) that configures the UE to be able to skip a communication associated with a grant. The UE may receive the grant for an uplink communication. The UE may transmit the uplink communication (e.g., MAC protocol data unit (PDU)) if data is available. Power consumption may increase if the grant is larger. If no data is available, the UE may not transmit the uplink communication.

If one or more CG-PUSCH occasions are skipped, the UE may indicate, in UCI, the one or more CG-PUSCH occasions that are skipped. CG-PUSCH occasions (also referred to herein as just "CG occasions") that are skipped may be considered to be "unused." CG occasions that are not skipped and can be used are considered to be "not unused." Because CG occasions that are not skipped may still not be used (due to traffic or scheduling reasons), the CG occasions cannot be considered to be definitely "used" and thus such CG occasions that are not skipped may be considered to be "not unused." That is, CG occasions that are "not unused" may or may not be used. Accordingly, UCI may indicate which CG occasions are used and which CG occasions are not unused. UCI may explicitly indicate CG occasions that are not unused and the CG occasions that are unused can be derived. Similarly, UCI may explicitly indicate CG occasions that are unused and the CG occasions that are not unused can be derived. In sum, there may be different ways for the UCI to indicate which CG occasions are used and which CG occasions are not unused.

Note that a "not unused" CG occasion may also be called a "used" CG occasion. In either case, the UE is allowed to not transmit a PUSCH if there is no uplink data. The indication of "used" CG occasion may help the network entity to reduce blind detection efforts for overlapping CG occasions.

Each CG occasion may be identified with a CG occasion ID (e.g., index or other identifier). UCI may indicate a CG occasion that is the last not unused CG occasion or a CG occasion that is the first of multiple consecutive unused CG occasions. UCI may indicate that multiple consecutive CG occasions, based on a start occasion and a length, are unused (occasion ID numbering may or may not be consecutive). UCI may include a bit in a bitmap that indicates whether a CG occasion is unused, if a location of the bit in the bitmap is mapped to the occasion ID of the configured CG occasion. UCI may include a codepoint value that indicates that one or multiple CG occasions are unused, if the value is mapped to the occasion ID(s).

A CG period may comprise multiple CG occasions, where each CG occasion occurs at a configured time location (e.g., time slot) in the CG period. If multiple CG occasions indicated by the same UCI are not overlapping in the time domain, it is straightforward that the occasion ID is determined by the time slot of the CG occasion in the CG period. For example, a first CG occasion in time for a CG period has occasion ID=0, a second CG occasion in time has occasion ID=1, and so forth. In some scenarios, an initial occasion ID value may correspond to a first CG-PUSCH occasion indicated by UCI, and a lower or higher occasion ID corresponds to an earlier or later CG-PUSCH occasion indicated by UCI.

As indicated above, FIG. 4 is provided as an example. Other examples may differ from what is described with respect to FIG. 4.

Figure 5:
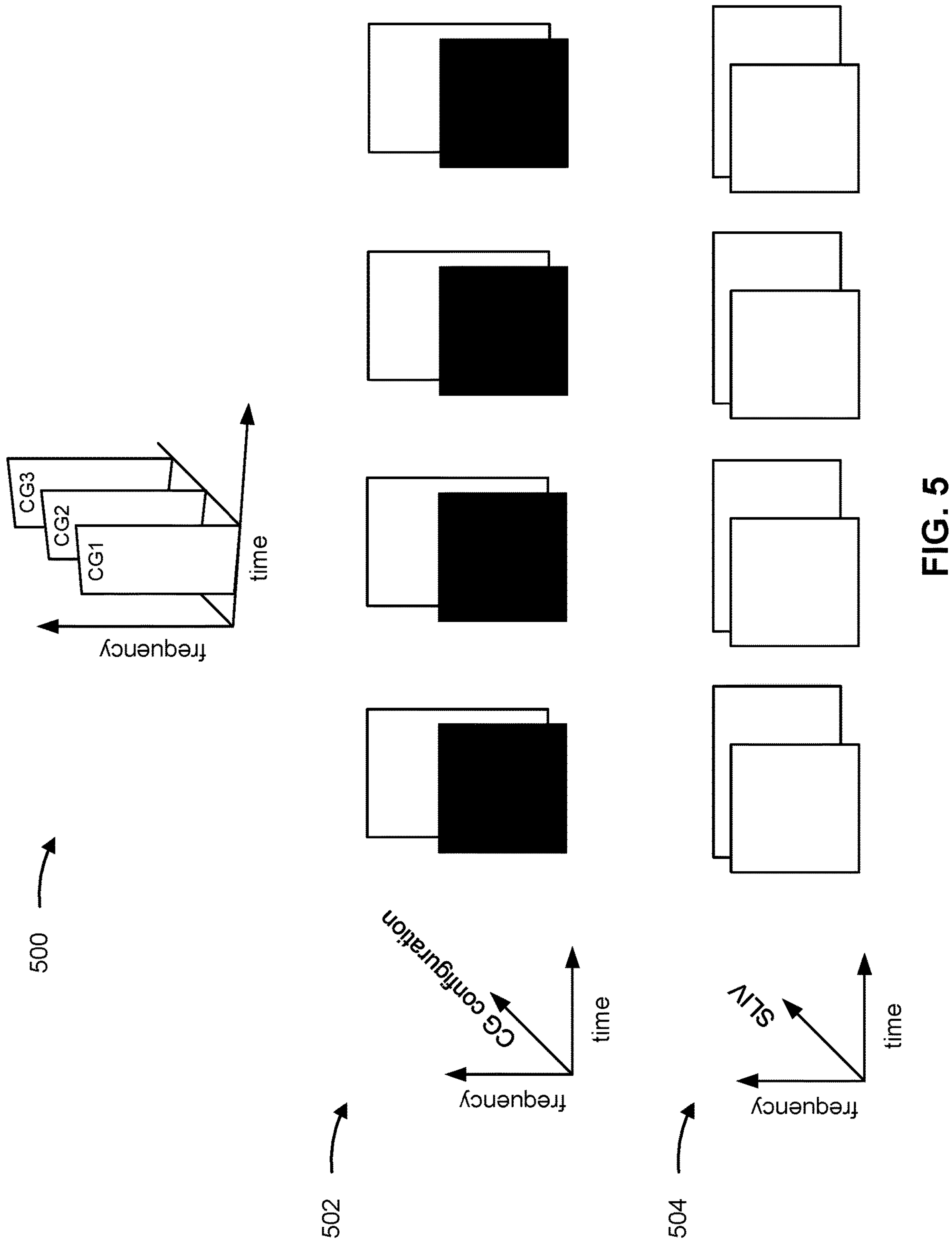
FIG. 5 is a diagram illustrating examples of overlapping CG occasions, in accordance with the present disclosure.

FIG. 5 is a diagram illustrating examples 500, 502, and 504 of overlapping CG occasions, in accordance with the present disclosure.

In some scenarios, CG occasions can overlap in time. Example 500 shows overlapping CG occasions in a CG time occasion (e.g., time slot), including a CG occasion for a first CG configuration (CG1), a CG occasion for a second CG configuration (CG2), and a CG occasion for a third CG configuration (CG3). If CG occasions are to be identified for each time slot in a CG period, and if multiple CG occasions can overlap in a time slot, it is not clear how a UE is to report the CG occasion ID selected for each time slot.

According to various aspects described herein, a UE may generate and transmit a message (e.g., UCI) that indicates, with one or more CG occasion IDs, one or more unused CG occasions and one or more not unused CG-PUSCH occasions (for one CG period or for multiple CG periods). Each respective CG occasion ID of the one or more CG occasion IDs may be associated with a respective time slot in which multiple CG-PUSCH occasions overlap in time. That is, the message may indicate, for each time slot of multiple time slots of a CG period, which CG occasion is selected among multiple CG occasions in a respective time slot. In some aspects, the CG occasion ID may be defined according to a rule. For example, a CG occasion with an earlier starting symbol indicated by the start and length indicator version (SLIV) has a lower CG occasion ID, or a CG occasion with an earlier end symbol indicated by the SLIV has a lower CG occasion ID. By specifying how CG occasion IDs are defined and/or reported for CG occasions that overlap in time, a UE may communicate unused and not unused resources to a network entity, and less signaling resources will be wasted.

In some aspects, CG occasions that overlap in each time slot may differ in the frequency domain and/or the time domain. Example 502 shows a CG period of four time slots, where each time slot has two overlapping CG occasions from two different CG configurations. The two CG occasions in a time slot may have the same SLIV but different end resource blocks (RBs) in a frequency domain resource allocation (FDRA). That is, the CG occasions are the same in the time domain but different in the frequency domain. Example 504 shows four time slots, where each time slot has two overlapping CG occasions from the same CG configuration. Each of the CG occasions in a time slot has the same starting symbol but different end symbols in a time domain resource allocation (TDRA). That is, the CG occasions are the same in the frequency domain but different in the time domain.

As indicated above, FIG. 5 provides some examples. Other examples may differ from what is described with regard to FIG. 5.

Figure 6:
FIG. 6 is a diagram illustrating an example associated with indicating unused and not unused CG occasions for CG occasions that can overlap in time, in accordance with the present disclosure.

FIG. 6 is a diagram illustrating an example 600 associated with indicating unused and not unused CG occasions for CG occasions that can overlap in time, in accordance with the present disclosure. As shown in FIG. 6, a network entity 610 (e.g., a network node 110) and a UE 620 (e.g., a UE 120) may communicate with one another via a wireless network (e.g., wireless network 100).

As shown by reference number 630, the UE 620 may generate a message (e.g., UCI) that indicates unused CG occasions and not unused CG occasions for CG occasions that overlap in time. In some aspects, the UE 620 may convey this information by indicating only the unused CG occasions for a CG period (or multiple CG periods). In some aspects, the UE 620 may convey the information by indicating only the not unused CG occasions. In some aspects, the UE 620 may indicate both unused and not unused CG occasions. The message may treat time slots of overlapping CG occasions as a single series of CG occasions. The single series may be based at least in part on a CG configuration index.

The overlapping CG occasions may belong to the same CG configuration or different CG configurations. If two CG occasions overlap in time, the CG occasions can have the same or different starting symbols, the same or different end symbols, the same or a different quantity of OFDM symbols (time duration), or the same or different FDRA (e.g., allocated RBs). In some aspects, overlapping CG occasions may share the same occasion ID or have different occasion IDs. The UE 620 may use different CG occasions based at least in part on the amount of resources (time and/or frequency) of the CG occasion.

In some aspects, if multiple CG occasions overlap in time and are indicated by the same UCI, the UE 620 may separately assign CG occasion IDs to the multiple CG occasions in a time slot based at least in part on a rule. For example, a CG occasion with a lower CG configuration index (e.g., RRC message ConfiguredGrantConfigIndex) may have a lower CG occasion ID than a CG occasion with a higher CG occasion index. A CG occasion with an earlier starting symbol indicated by the SLIV may have a lower CG occasion ID. A CG occasion with an earlier end symbol indicated by the SLIV may have a lower CG occasion ID. A CG occasion with a smaller quantity of symbols indicated by the SLIV may have a lower CG occasion ID. A CG occasion with a lower frequency starting RB in the FDRA may have a lower CG occasion ID. A CG occasion with a lower frequency end RB in the FDRA may have a lower CG occasion ID. A CG occasion with a smaller quantity of RBs in the FDRA may have a lower CG occasion ID. A CG occasion with a lower index of the TDRA information among TDRAs of PUSCHs configured for the CG configuration may have a lower CG occasion ID. In the rules, the lower CG occasion ID may be replaced with a higher CG occasion ID. The UE 620 may receive a configuration for assigning CG occasion IDs (defined for CG periods).

In some aspects, one or multiple rules may be applied in any order. For example, the UE 620 may assign CG occasion IDs to multiple CG occasions in an order such as CG configuration index, starting symbol, end symbol, and then starting RB. In another example, the UE 620 may assign CG occasion IDs in an order such as starting symbol, end symbol, and then CG configuration index.

As shown by reference number 635, the UE 620 may transmit the message. As shown by reference number 640, the network entity 610 may adjust communications based at least in part on the unused CG occasions. For example, the network entity 610 may schedule other UEs for time slots of unused CG occasions of the UE 620. The network entity 610 may conserve power or reschedule communications for the time slots of the unused CG occasions.

As indicated above, FIG. 6 is provided as an example. Other examples may differ from what is described with respect to FIG. 6.

Figure 7:
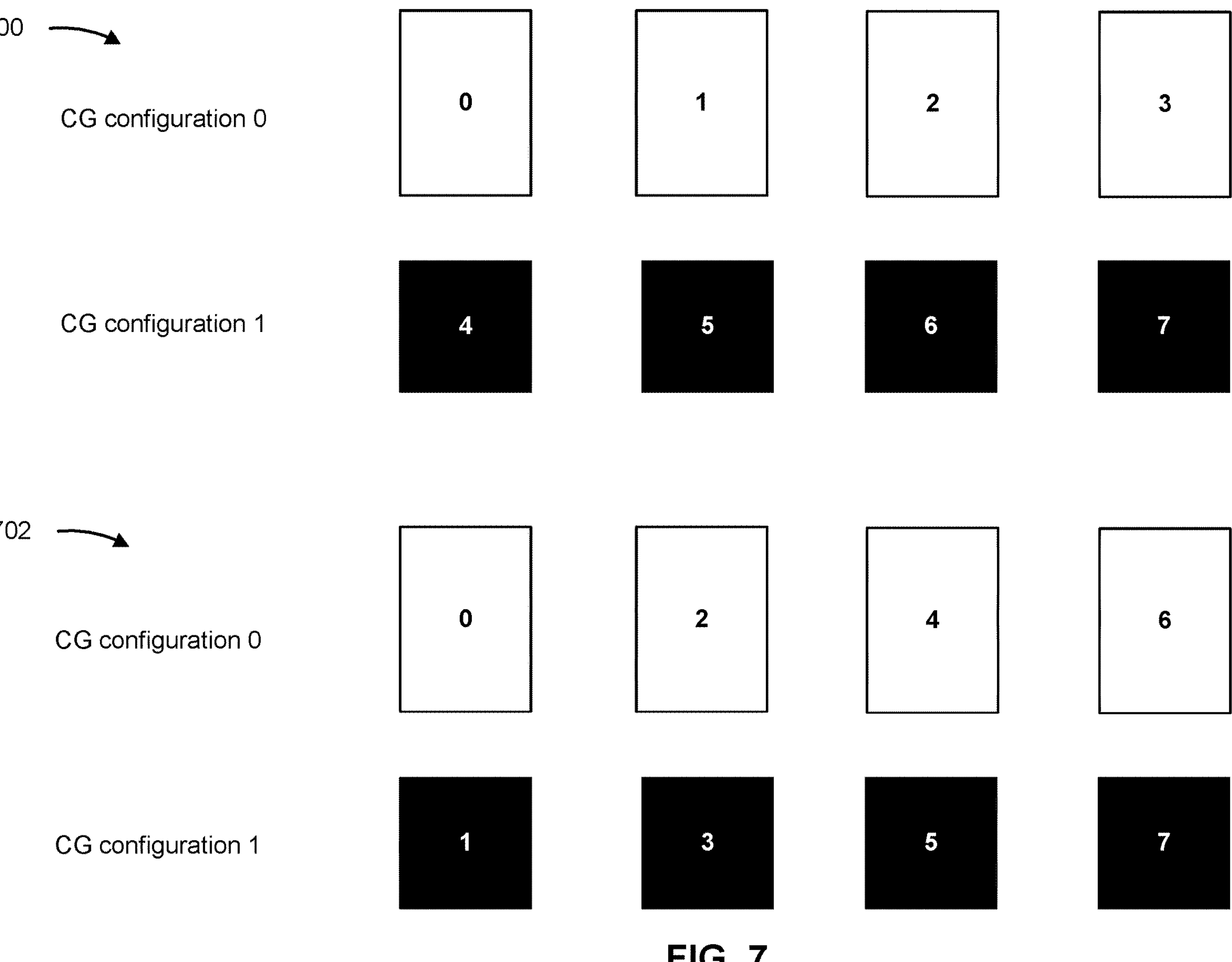
FIG. 7 is a diagram illustrating examples of CG occasion identifier (ID) orders, in accordance with the present disclosure.

FIG. 7 is a diagram illustrating examples 700 and 702 of CG occasion ID orders, in accordance with the present disclosure.

In some aspects, CG occasion IDs may be ordered within a CG configuration or across CG configurations. CG occasion IDs may be assigned to candidate CG occasions for selection (candidate CG occasion IDs). Once a CG candidate CG occasion is selected, the CG occasion ID that is reported for that time slot may be the CG occasion ID for the candidate CG occasion that was selected.

Example 700 shows candidate CG occasion IDs ordered within a CG configuration (e.g., CG configuration 0), such as CG occasion ID=0 for the first time slot of CG configuration 0, CG occasion ID=1 for the second time slot of CG configuration 0, CG occasion ID=2 for the third time slot of CG configuration 0, and CG occasion ID=3 for the fourth time slot of CG configuration 0. That is, the numbers for the CG occasion IDs are contiguous within CG configuration 0. Candidate CG occasion IDs 4, 5, 6, and 7 are assigned in order for CG configuration 1. In example 700, the CG occasion IDs may be based at least in part on a starting symbol within each CG configuration.

Example 702 shows candidate CG occasion IDs ordered across CG configurations. In a first time slot, CG occasion ID=0 for a CG occasion for CG configuration 0, and CG occasion ID=1 for a CG occasion for CG configuration 1. In a second time slot, CG occasion ID=2 for a CG occasion for CG configuration 0, and CG occasion ID=3 for a CG occasion for CG configuration 1. In a third time slot, CG occasion ID=4 for a CG occasion for CG configuration 0, and CG occasion ID=5 for a CG occasion for CG configuration 1. In a fourth time slot, CG occasion ID=6 for a CG occasion for CG configuration 0, and CG occasion ID=7 for a CG occasion for CG configuration 1. That is, a candidate CG occasion ID for CG configuration 0 in a CG occasion and a candidate CG occasion ID for CG configuration 1 in the CG occasion (time slot) are contiguous within the time slot. In example 702, the CG occasion IDs for a time slot may be based at least in part on a CG configuration index and then a starting symbol.

As indicated above, FIG. 7 provides some examples. Other examples may differ from what is described with regard to FIG. 7.

Figure 8A:
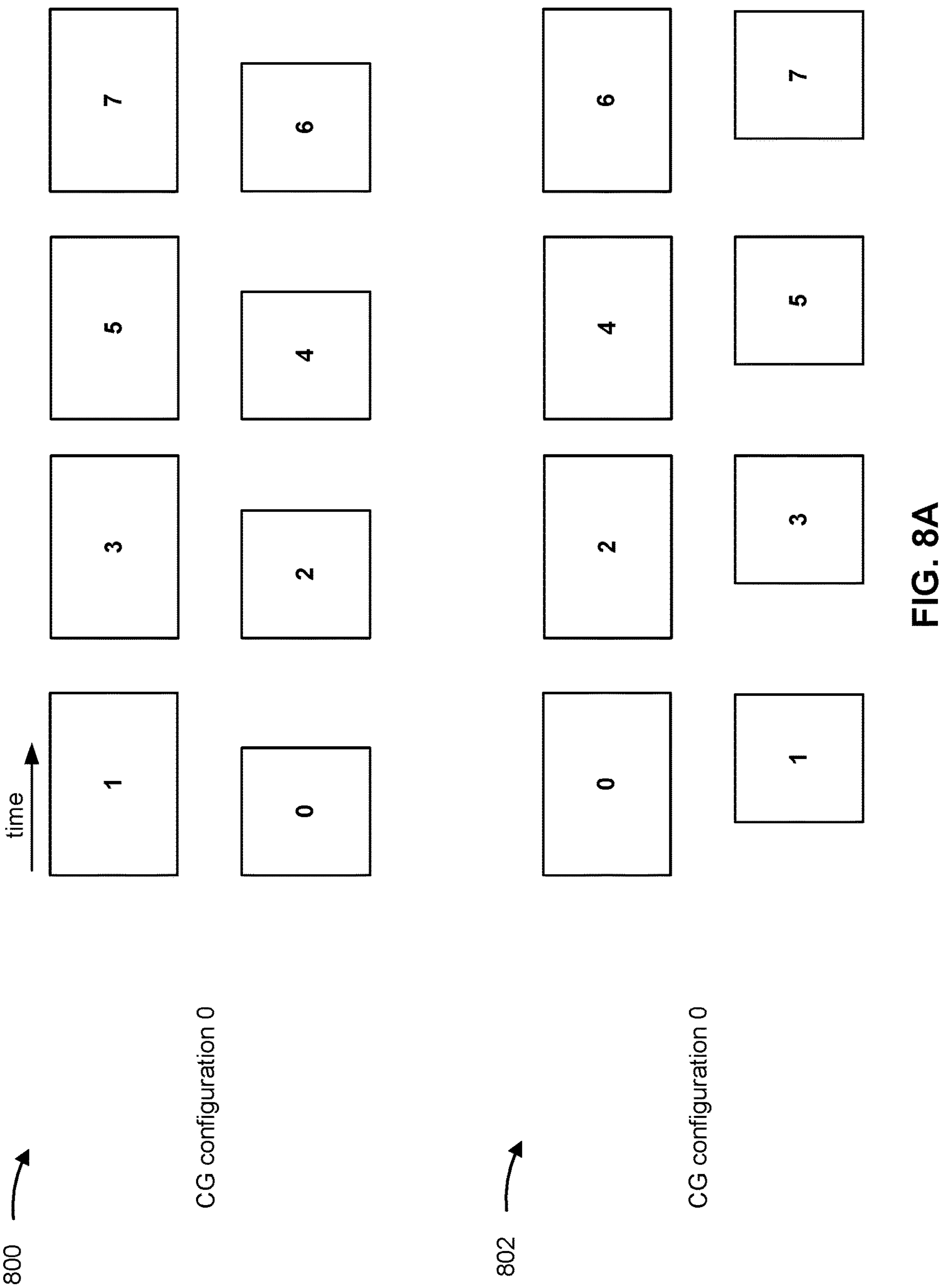
FIGS. 8A and 8B are diagrams illustrating examples of CG occasion IDs, in accordance with the present disclosure.
Figure 8B:
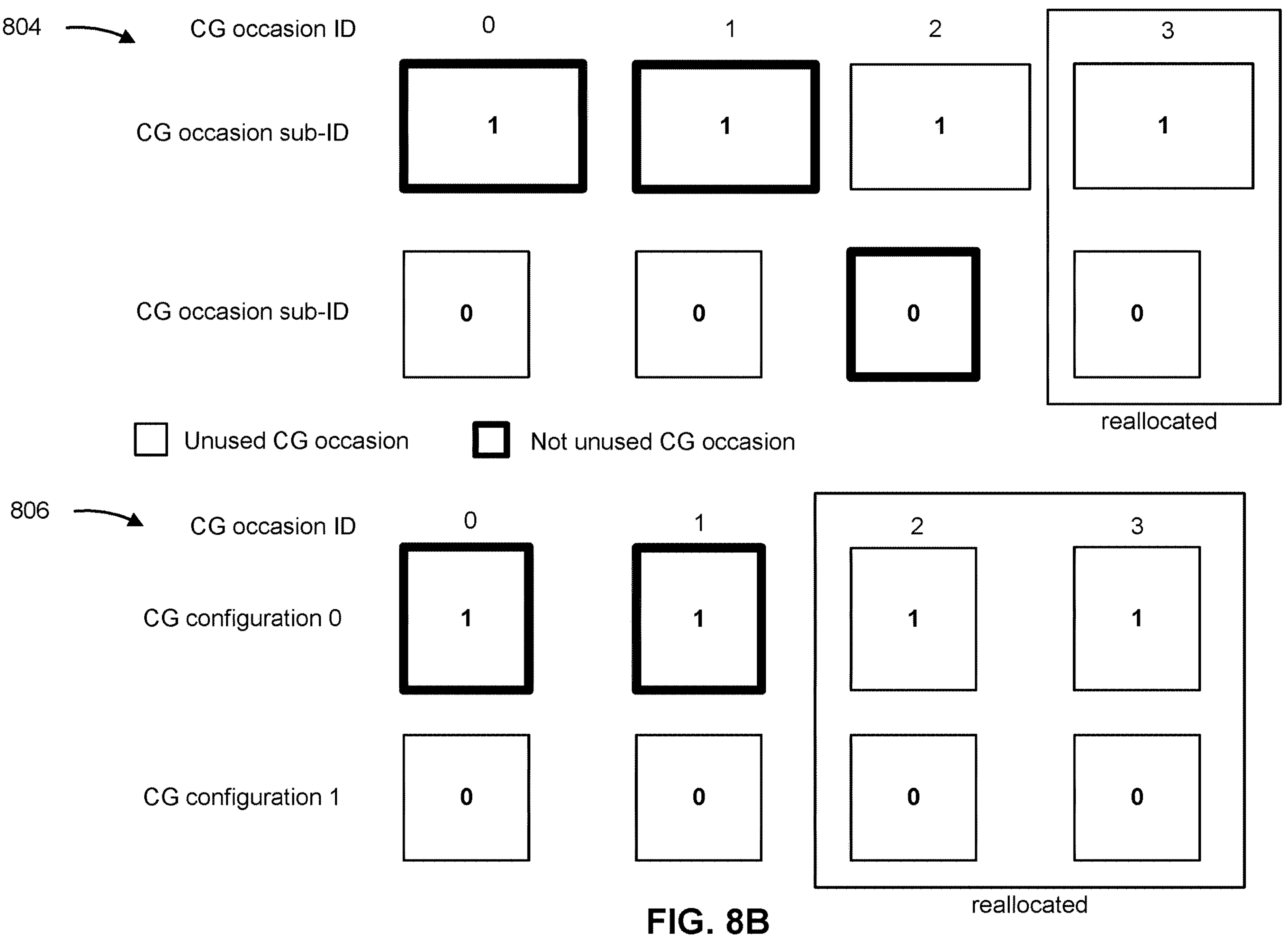

FIGS. 8A-8B are diagrams illustrating examples 800, 802, 804, and 806 of CG occasion IDs, in accordance with the present disclosure.

Example 800 of FIG. 8A shows two candidate CG occasions of the same CG configuration (e.g., CG configuration 0) in each time slot, where the candidate CG occasions differ in the quantity of symbols (time duration). The CG occasion ID order may be contiguous within a time slot but ordered based on the end symbol (same start symbol). Example 800 shows the shorter candidate CG occasion (end symbol comes earlier) having CG occasion ID=0 and the longer candidate CG occasion (end symbol comes later) having CG occasion ID=1. This pattern continues for the other time slots. Example 802 of FIG. 8A shows a similar concept except that the CG occasion IDs are ordered based on the start symbol.

In some aspects, if multiple CG occasions overlap in time and are indicated by the same UCI, the UE 620 may assign the same CG occasion ID to all of the overlapping CG occasions within a time slot. The UE 620 may assign a lower CG occasion ID to the overlapping CG occasions that have a lower starting symbol index (e.g., based at least in part on a starting symbol index of the first CG occasion or an end symbol index of the last CG occasion among the overlapping occasions).

In some aspects, if overlapping CG occasions share the same CG occasion ID, when the UE 620 indicates which CG occasions are unused or not unused, the UE 620 may indicate a sub-ID (second ID) of the CG occasion that is unused or not unused. Sub-IDs may be assigned according to a rule that is similar to a rule for assigning CG occasion sub-IDs. For example, a CG occasion with a lower CG configuration index (e.g., RRC message ConfiguredGrant-ConfigIndex) may have a lower CG occasion sub-ID than a CG occasion with a higher CG occasion index. A CG occasion with an earlier starting symbol indicated by the SLIV may have a lower CG occasion sub-ID. A CG occasion with an earlier end symbol indicated by the SLIV may have a lower CG occasion sub-ID. A CG occasion with a smaller quantity of symbols in the SLIV may have a lower CG occasion sub-ID. A CG occasion with a lower frequency starting RB in the FDRA may have a lower CG occasion sub-ID. A CG occasion with a lower frequency end RB in the FDRA may have a lower CG occasion sub-ID. A CG occasion with a smaller quantity of RBs in the FDRA may have a lower CG occasion sub-ID. A CG occasion with a lower index of the TDRA information among TDRAs of PUSCHs configured for the CG configuration may have a lower CG occasion sub-ID. In the rules, the lower CG occasion sub-ID may be replaced with a higher CG occasion sub-ID. Other aspects that involve CG occasion IDs may be used for CG occasion sub-IDs.

In some aspects, the UE 620 may report a specific sub-ID that indicates that all overlapping CG occasions that share the same occasion ID are unused. The specific sub-ID can be 0 (zero) or the quantity of the overlapping CG occasions that share the same occasion ID.

In some aspects, the CG occasion ID and CG occasion sub-ID may have less overhead for signaling if the sub-ID is expected only for the last not unused CG occasion among overlapping CG occasions. For overlapping CG occasions sharing the same occasion ID but having different sub-IDs, and for each CG occasion ID that is assigned to a not unused CG occasion before the last (in time) not unused CG occasion, the network entity 610 and the UE 620 may expect that the previous CG occasion(s) are not unused. The previous CG occasions may be assigned with one or more default/predetermined sub-ID(s). The default sub-ID may be for the candidate CG occasion that has the largest, smallest, or middle amount of resources (i.e., quantity of resource elements). The default sub-ID may be for one or more specific sub-IDs configured by the network entity 610. If multiple default sub-IDs are expected, the network entity 610 may blindly detect a PUSCH communication based at least in part on PUSCH resource allocations associated with the CG occasions with the default sub-IDs.

In some aspects, the UE 620 may indicate unused CG occasion(s) by indicating the sub-ID for the not unused CG occasion associated with the last CG occasion ID that is assigned to a not unused CG occasion. For each early occasion ID assigned to a not unused CG occasion, the UE 620 may not need to indicate a sub-ID. If only the first CG occasion ID is assigned to a not unused CG occasion, one or multiple default/pre-determined sub-IDs may be expected for the first CG occasion ID if the network entity 610 cannot decode the UCI indicating which CG occasions associated with the first CG occasion ID are unused or not used, before detecting the resource allocation hypotheses for CG occasions associated with the CG occasion ID. If multiple predetermined sub-IDs are expected, the network entity 610 may blindly detect the resource allocation hypotheses associated with the sub-IDs.

Example 804 of FIG. 8B shows that CG occasion ID 2 is assigned to the last not unused CG occasion. CG occasions starting from CG occasion ID 3 are unused. A CG occasion assigned sub-ID 0 is not unused for CG occasion ID 2. For CG occasion IDs 0 and 1, CG occasion sub-ID 1 is implicitly indicated and corresponds to a CG occasion with a larger quantity of resources than the CG occasion associated with CG occasion sub-ID 0. The network entity 610 may reallocate the unused CG occasion.

Example 806 shows multiple CG configurations indicated by the same UCI. The last not unused CG occasion 1 may be indicated and the network entity 610 may expect that previous CG occasions before the last not unused CG occasion 1 use a default CG configuration or a default sub-ID.

As indicated above, FIGS. 8A and 8B are provided as an example. Other examples may differ from what is described with regard to FIGS. 8A and 8B.

Figure 9:
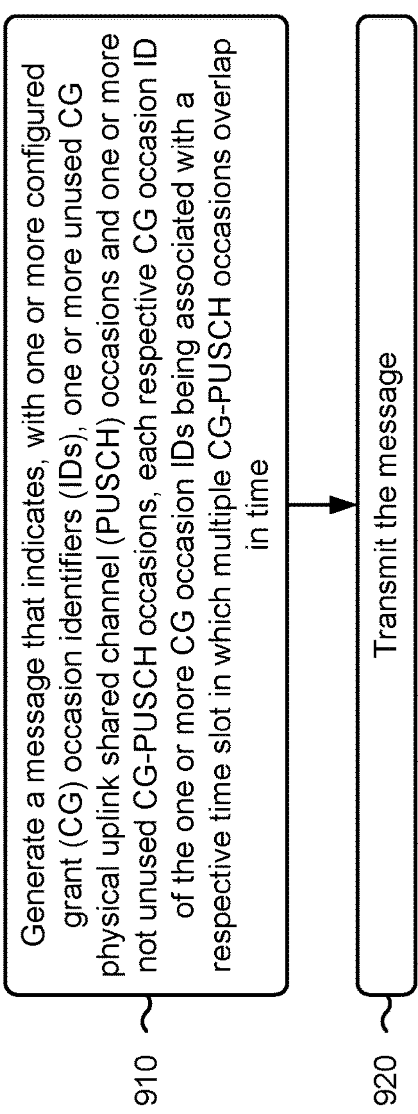
FIG. 9 is a diagram illustrating an example process performed, for example, by a UE, in accordance with the present disclosure.
Figure 9:

FIG. 9 is a diagram illustrating an example process 900 performed, for example, by a UE, in accordance with the present disclosure. Example process 900 is an example where the UE (e.g., UE 120, UE 620) performs operations associated with indicating unused CG occasions and not unused CG occasions for CG occasions that overlap in time.

As shown in FIG. 9, in some aspects, process 900 may include generating a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time (block 910). For example, the UE (e.g., using communication manager 1106, depicted in FIG. 11) may generate a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time, as described above.

As further shown in FIG. 9, in some aspects, process 900 may include transmitting the message (block 920). For example, the UE (e.g., using transmission component 1104 and/or communication manager 1106, depicted in FIG. 11) may transmit the message, as described above.

Process 900 may include additional aspects, such as any single aspect or any combination of aspects described below and/or in connection with one or more other processes described elsewhere herein.

In a first aspect, the multiple CG-PUSCH occasions of each respective time slot include a first CG-PUSCH occasion that overlaps with a second CG-PUSCH occasion, where a start and length indicator version (SLIV) of the first CG-PUSCH occasion and an SLIV of the second CG-PUSCH occasion are the same, and one or more of a start resource block (RB) of the first CG-PUSCH occasion and a start RB of the second CG-PUSCH occasion are different, or an end RB of the first CG-PUSCH occasion and an end RB of the second CG-PUSCH occasion are different.

In a second aspect, alone or in combination with the first aspect, the multiple CG-PUSCH occasions of each respective time slot include a first CG-PUSCH occasion and a second CG-PUSCH occasion, where an FDRA of the first CG-PUSCH occasion and an FDRA of the second CG-PUSCH occasion are the same, and one or more of a start symbol of the first CG-PUSCH occasion and a start symbol of the second CG-PUSCH occasion are different, or an end symbol of the first CG-PUSCH occasion and an end symbol of the second CG-PUSCH occasion are different.

In a third aspect, alone or in combination with one or more of the first and second aspects, each respective CG occasion ID of the one or more CG occasion IDs is based at least in part on an associated CG configuration index.

In a fourth aspect, alone or in combination with one or more of the first through third aspects, each respective CG occasion ID of the one or more CG occasion IDs is based at least in part on a start symbol in an associated start and length indicator version.

In a fifth aspect, alone or in combination with one or more of the first through fourth aspects, each respective CG occasion ID of the one or more CG occasion IDs is based at least in part on an end symbol in an associated start and length indicator version.

In a sixth aspect, alone or in combination with one or more of the first through fifth aspects, each respective CG occasion ID of the one or more CG occasion IDs is based at least in part on a quantity of symbols in an associated start and length indicator version.

In a seventh aspect, alone or in combination with one or more of the first through sixth aspects, each respective CG occasion ID of the one or more CG occasion IDs is based at least in part on a frequency of a start resource block in an associated frequency domain resource allocation.

In an eighth aspect, alone or in combination with one or more of the first through seventh aspects, each respective CG occasion ID of the one or more CG occasion IDs is based at least in part on a frequency of an end resource block in an associated frequency domain resource allocation.

In a ninth aspect, alone or in combination with one or more of the first through eighth aspects, each respective CG occasion ID of the one or more CG occasion IDs is based at least in part on a quantity of resource blocks in an associated frequency domain resource allocation.

In a tenth aspect, alone or in combination with one or more of the first through ninth aspects, each respective CG occasion ID of the one or more CG occasion IDs is based at least in part on an index of a TDRA among multiple TDRAs of CG-PUSCH occasions configured for an associated CG configuration.

In an eleventh aspect, alone or in combination with one or more of the first through tenth aspects, generating the message includes selecting the one or more CG occasion IDs from among multiple candidate CG occasion IDs for a first CG configuration that are different than multiple candidate CG occasion IDs for a second CG configuration.

In a twelfth aspect, alone or in combination with one or more of the first through eleventh aspects, the multiple candidate CG occasion IDs for the first CG configuration are contiguous in number, and the multiple candidate CG occasion IDs for the second CG configuration are contiguous in number.

In a thirteenth aspect, alone or in combination with one or more of the first through twelfth aspects, a candidate CG occasion ID for the first CG configuration in a CG-PUSCH occasion and a candidate CG occasion ID for the second CG configuration in the CG-PUSCH occasion are contiguous in number.

In a fourteenth aspect, alone or in combination with one or more of the first through thirteenth aspects, the message includes, for each CG-PUSCH occasion time slot in a sequence of CG-PUSCH occasion time slots, a bit or a codepoint that indicates a respective CG occasion ID of the one or more CG occasion IDs.

In a fifteenth aspect, alone or in combination with one or more of the first through fourteenth aspects, each respective CG occasion ID of the one or more CG occasion IDs indicates whether more than one CG-PUSCH occasion of the multiple CG-PUSCH occasions that overlap in time in the respective time slot for the respective CG occasion ID are unused or not unused.

In a sixteenth aspect, alone or in combination with one or more of the first through fifteenth aspects, each CG-PUSCH occasion of the multiple CG-PUSCH occasions that overlap in time in a respective time slot associated with a respective CG occasion ID is identified by a sub-ID, and the message includes one or more sub-IDs with each CG occasion ID to indicate the one or more unused CG-PUSCH occasions and the one or more not unused CG-PUSCH occasions in the respective time slot.

In a seventeenth aspect, alone or in combination with one or more of the first through sixteenth aspects, the message includes a sub-ID that indicates that all of the multiple CG-PUSCH occasions associated with a CG occasion ID are unused.

In an eighteenth aspect, alone or in combination with one or more of the first through seventeenth aspects, the one or more CG occasion IDs include a CG occasion ID associated with a last not unused CG-PUSCH occasion time slot in a CG period, and all CG-PUSCH occasion time slots of the CG period prior to the last not unused CG-PUSCH time slot are not unused.

In a nineteenth aspect, alone or in combination with one or more of the first through eighteenth aspects, the UE is configured to use one or more default CG-PUSCH occasions in each of the CG-PUSCH occasion time slots of the CG period prior to the last not unused CG-PUSCH time slot.

In a twentieth aspect, alone or in combination with one or more of the first through nineteenth aspects, the message includes one or more sub-IDs with the CG occasion ID that indicate CG-PUSCH occasions that are unused and CG-PUSCH occasions that are not unused in the last not unused CG-PUSCH time slot.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
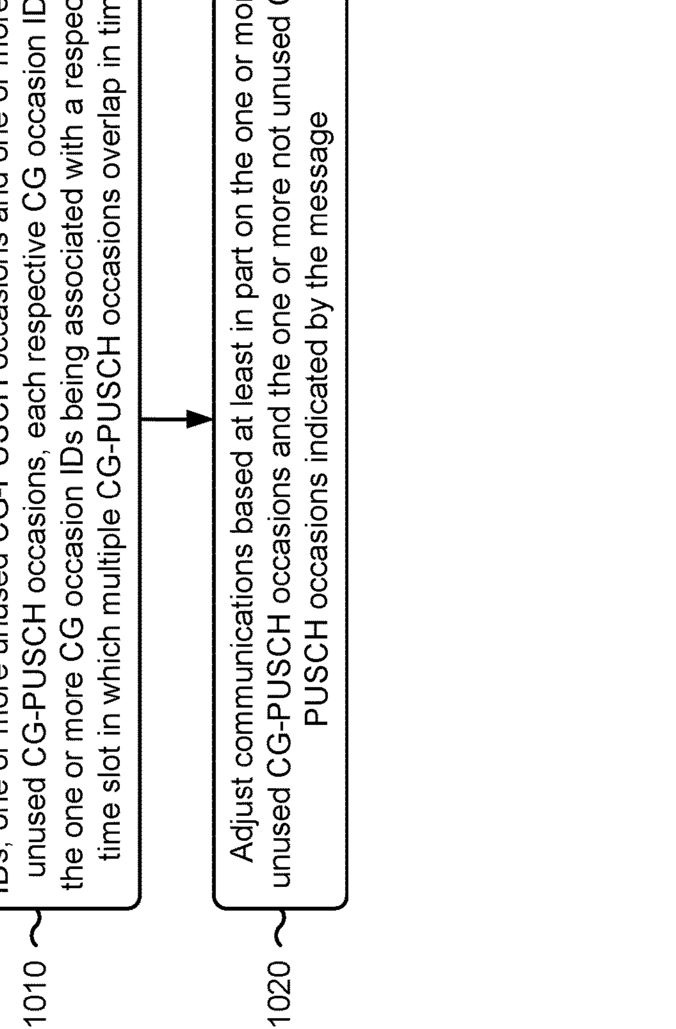
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., network node 110, network entity 610) performs operations associated with using an indication of unused CG occasions and not unused CG occasions.

As shown in FIG. 10, in some aspects, process 1000 may include receiving a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time (block 1010). For example, the network entity (e.g., using reception component 1202 and/or communication manager 1206, depicted in FIG. 12) may receive a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time, as described above.

As further shown in FIG. 10, in some aspects, process 1000 may include adjusting communications based at least in part on the one or more unused CG-PUSCH occasions and the one or more not unused CG-PUSCH occasions indicated by the message (block 1020). For example, the network entity (e.g., using communication manager 1206, depicted in FIG. 12) may adjust communications based at least in part on the one or more unused CG-PUSCH occasions and the one or more not unused CG-PUSCH occasions indicated by the message, as described above.

Process 1000 may include additional aspects, such as any single aspect or any combination of aspects described below and/or in connection with one or more other processes described elsewhere herein.

In a first aspect, the message includes, for each CG-PUSCH occasion time slot in a sequence of CG-PUSCH occasion time slots, a bit or a codepoint that indicates a respective CG occasion ID of the one or more CG occasion IDs.

In a second aspect, alone or in combination with the first aspect, each respective CG occasion ID of the one or more CG occasion IDs indicates whether all of the multiple CG-PUSCH occasions that overlap in time in the respective time slot for the respective CG occasion ID are unused or not unused.

In a third aspect, alone or in combination with one or more of the first and second aspects, each CG-PUSCH occasion of the multiple CG-PUSCH occasions that overlap in time in a respective time slot associated with a respective CG occasion ID is identified by a sub-ID, and the message includes one or more sub-IDs with each CG occasion ID to indicate the one or more unused CG-PUSCH occasions and the one or more not unused CG-PUSCH occasions in the respective time slot.

In a fourth aspect, alone or in combination with one or more of the first through third aspects, the message includes a sub-ID that indicates that all of the multiple CG-PUSCH occasions associated with a CG occasion ID are unused.

In a fifth aspect, alone or in combination with one or more of the first through fourth aspects, the one or more CG occasion IDs include a CG occasion ID associated with a last not unused CG-PUSCH occasion time slot in a CG period, and all CG-PUSCH occasion time slots of the CG period prior to the last not unused CG-PUSCH time slot are not unused.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
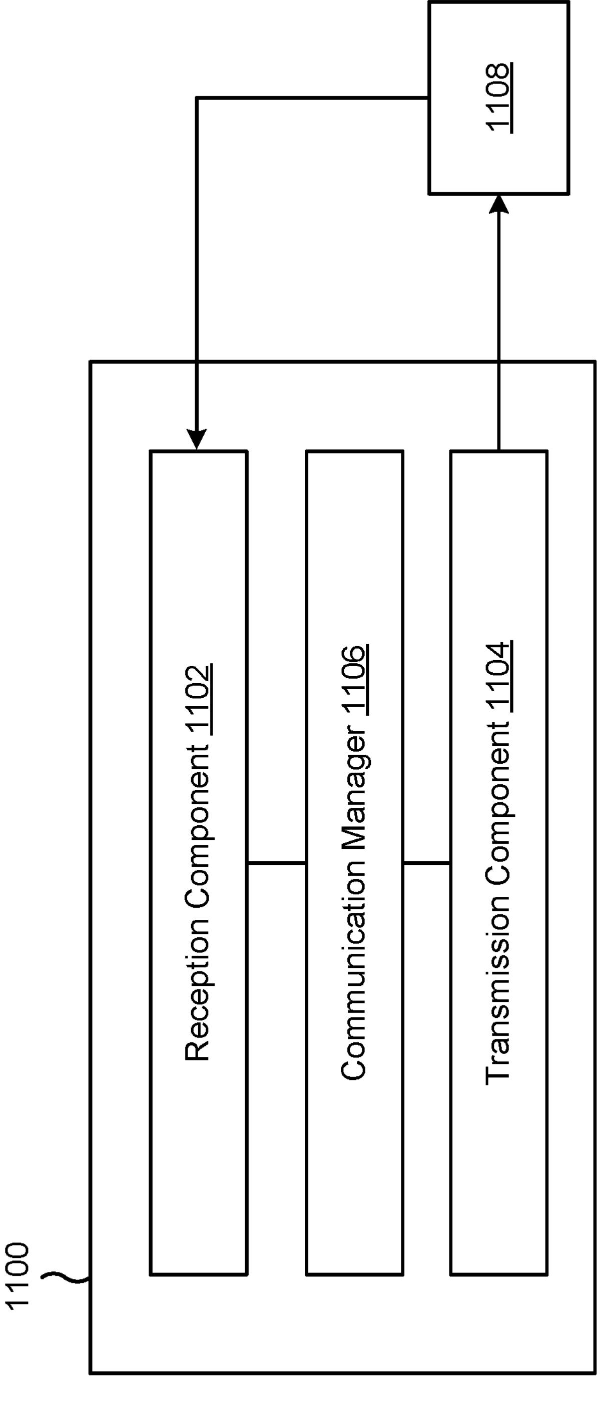
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., UE 120, UE 620), or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 1-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may generate a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The transmission component 1104 may transmit the message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
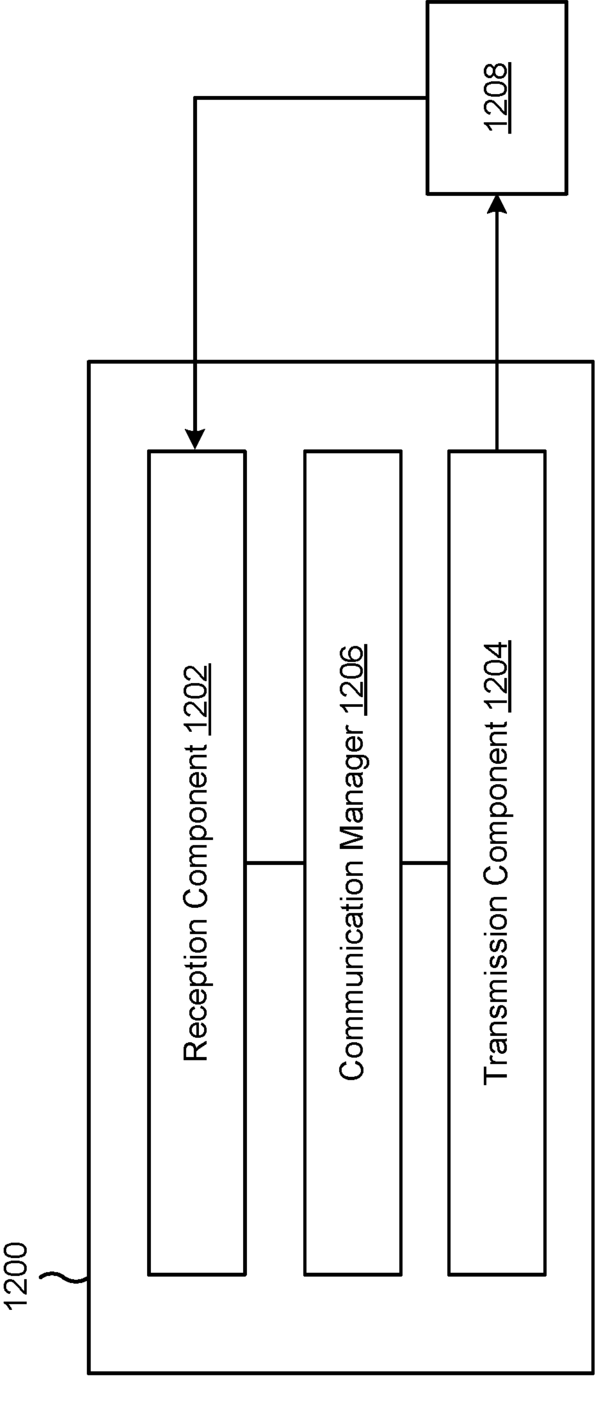
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network entity (e.g., network node 110, network entity 610), or a network entity may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network entity described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network entity described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a message that indicates, with one or more CG occasion IDs, one or more unused CG-PUSCH occasions and one or more not unused CG-PUSCH occasions, each respective CG occasion ID of the one or more CG occasion IDs being associated with a respective time slot in which multiple CG-PUSCH occasions overlap in time. The communication manager 1206 may adjust communications based at least in part on the one or more unused CG-PUSCH occasions and the one or more not unused CG-PUSCH occasions indicated by the message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: generating a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time; and transmitting the message.

Aspect 2: The method of Aspect 1, wherein the multiple CG-PUSCH occasions of each respective time slot include a first CG-PUSCH occasion that overlaps with a second CG-PUSCH occasion, wherein a start and length indicator version (SLIV) of the first CG-PUSCH occasion and an SLIV of the second CG-PUSCH occasion are the same, and wherein one or more of: a start resource block (RB) of the first CG-PUSCH occasion and a start RB of the second CG-PUSCH occasion are different, or an end RB of the first CG-PUSCH occasion and an end RB of the second CG-PUSCH occasion are different.

Aspect 3: The method of Aspect 1, wherein the multiple CG-PUSCH occasions of each respective time slot include a first CG-PUSCH occasion and a second CG-PUSCH occasion, wherein a frequency domain resource allocation (FDRA) of the first CG-PUSCH occasion and a FDRA of the second CG-PUSCH occasion are the same, and wherein one or more of: a start symbol of the first CG-PUSCH occasion and a start symbol of the second CG-PUSCH occasion are different, or an end symbol of the first CG-PUSCH occasion and an end symbol of the second CG-PUSCH occasion are different.

Aspect 4: The method of any of Aspects 1-3, wherein each respective CG occasion ID of the one or more CG occasion IDs is based at least in part on an associated CG configuration index.

Aspect 5: The method of any of Aspects 1-4, wherein each respective CG occasion ID of the one or more CG occasion IDs is based at least in part on a start symbol in an associated start and length indicator version.

Aspect 6: The method of any of Aspects 1-5, wherein each respective CG occasion ID of the one or more CG occasion IDs is based at least in part on an end symbol in an associated start and length indicator version.

Aspect 7: The method of any of Aspects 1-6, wherein each respective CG occasion ID of the one or more CG occasion IDs is based at least in part on a quantity of symbols in an associated start and length indicator version.

Aspect 8: The method of any of Aspects 1-7, wherein each respective CG occasion ID of the one or more CG occasion IDs is based at least in part on a frequency of a start resource block in an associated frequency domain resource allocation.

Aspect 9: The method of any of Aspects 1-8, wherein each respective CG occasion ID of the one or more CG occasion IDs is based at least in part on a frequency of an end resource block in an associated frequency domain resource allocation.

Aspect 10: The method of any of Aspects 1-9, wherein each respective CG occasion ID of the one or more CG occasion IDs is based at least in part on a quantity of resource blocks in an associated frequency domain resource allocation.

Aspect 11: The method of any of Aspects 1-10, wherein each respective CG occasion ID of the one or more CG occasion IDs is based at least in part on an index of a time domain resource allocation (TDRA) among multiple TDRAs of CG-PUSCH occasions configured for an associated CG configuration.

Aspect 12: The method of any of Aspects 1-11, wherein generating the message includes selecting the one or more CG occasion IDs from among multiple candidate CG occasion IDs for a first CG configuration that are different than multiple candidate CG occasion IDs for a second CG configuration.

Aspect 13: The method of Aspect 12, wherein the multiple candidate CG occasion IDs for the first CG configuration are contiguous in number, and wherein the multiple candidate CG occasion IDs for the second CG configuration are contiguous in number.

Aspect 14: The method of Aspect 12, wherein a candidate CG occasion ID for the first CG configuration in a CG-PUSCH occasion and a candidate CG occasion ID for the second CG configuration in the CG-PUSCH occasion are contiguous in number.

Aspect 15: The method of any of Aspects 1-14, wherein the message includes, for each CG-PUSCH occasion time slot in a sequence of CG-PUSCH occasion time slots, a bit or a codepoint that indicates a respective CG occasion ID of the one or more CG occasion IDs.

Aspect 16: The method of any of Aspects 1-15, wherein each respective CG occasion ID of the one or more CG occasion IDs indicates whether more than one CG-PUSCH occasion of the multiple CG-PUSCH occasions that overlap in time in the respective time slot for the respective CG occasion ID are unused or not unused.

Aspect 17: The method of any of Aspects 1-16, wherein each CG-PUSCH occasion of the multiple CG-PUSCH occasions that overlap in time in a respective time slot associated with a respective CG occasion ID is identified by a sub-ID, and wherein the message includes one or more sub-IDs with each CG occasion ID to indicate the one or more unused CG-PUSCH occasions and the one or more not unused CG-PUSCH occasions in the respective time slot.

Aspect 18: The method of any of Aspects 1-17, wherein the message includes a sub-ID that indicates that all of the multiple CG-PUSCH occasions associated with a CG occasion ID are unused.

Aspect 19: The method of any of Aspects 1-18, wherein the one or more CG occasion IDs include a CG occasion ID associated with a last not unused CG-PUSCH occasion time slot in a CG period, and wherein all CG-PUSCH occasion time slots of the CG period prior to the last not unused CG-PUSCH time slot are not unused.

Aspect 20: The method of Aspect 19, wherein the UE is configured to use one or more default CG-PUSCH occasions in each of the CG-PUSCH occasion time slots of the CG period prior to the last not unused CG-PUSCH time slot.

Aspect 21: The method of Aspect 19, wherein the message includes one or more sub-IDs with the CG occasion ID that indicate CG-PUSCH occasions that are unused and CG-PUSCH occasions that are not unused in the last not unused CG-PUSCH time slot.

Aspect 22: A method of wireless communication performed by a network entity, comprising: receiving a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time; and adjusting communications based at least in part on the one or more unused CG-PUSCH occasions and the one or more not unused CG-PUSCH occasions indicated by the message.

Aspect 23: The method of Aspect 22, wherein the message includes, for each CG-PUSCH occasion time slot in a sequence of CG-PUSCH occasion time slots, a bit or a codepoint that indicates a respective CG occasion ID of the one or more CG occasion IDs.

Aspect 24: The method of any of Aspects 22-23, wherein each respective CG occasion ID of the one or more CG occasion IDs indicates whether all of the multiple CG-PUSCH occasions that overlap in time in the respective time slot for the respective CG occasion ID are unused or not unused.

Aspect 25: The method of any of Aspects 22-24, wherein each CG-PUSCH occasion of the multiple CG-PUSCH occasions that overlap in time in a respective time slot associated with a respective CG occasion ID is identified by a sub-ID, and wherein the message includes one or more sub-IDs with each CG occasion ID to indicate the one or more unused CG-PUSCH occasions and the one or more not unused CG-PUSCH occasions in the respective time slot.

Aspect 26: The method of any of Aspects 22-25, wherein the message includes a sub-ID that indicates that all of the multiple CG-PUSCH occasions associated with a CG occasion ID are unused.

Aspect 27: The method of any of Aspects 22-26, wherein the one or more CG occasion IDs include a CG occasion ID associated with a last not unused CG-PUSCH occasion time slot in a CG period, and wherein all CG-PUSCH occasion time slots of the CG period prior to the last not unused CG-PUSCH time slot are not unused.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

generate a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time; and transmit the message, wherein the multiple CG-PUSCH occasions of each respective time slot include a first CG-PUSCH occasion that overlaps with a second CG-PUSCH occasion, wherein a start and length indicator version (SLIV) of the first CG-PUSCH occasion and an SLIV of the second CG-PUSCH occasion are the same, and wherein one or more of:

a start resource block (RB) of the first CG-PUSCH occasion and a start RB of the second CG-PUSCH occasion are different, or an end RB of the first CG-PUSCH occasion and an end RB of the second CG-PUSCH occasion are different.

2. A user equipment (UE) for wireless communication, comprising:

a memory; and one or more processors, coupled to the memory, configured to:

generate a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time; and transmit the message, wherein the multiple CG-PUSCH occasions of each respective time slot include a first CG-PUSCH occasion and a second CG-PUSCH occasion, wherein a frequency domain resource allocation (FDRA) of the first CG-PUSCH occasion and a FDRA of the second CG-PUSCH occasion are the same, and wherein one or more of:

a start symbol of the first CG-PUSCH occasion and a start symbol of the second CG-PUSCH occasion are different, or an end symbol of the first CG-PUSCH occasion and an end symbol of the second CG-PUSCH occasion are different.

3. The UE of claim 1, wherein each respective CG occasion ID of the one or more CG occasion IDs is based at least in part on an associated CG configuration index.

4. The UE of claim 1, wherein each respective CG occasion ID of the one or more CG occasion IDs is based at least in part on a start symbol in an associated start and length indicator version.

5. The UE of claim 1, wherein each respective CG occasion ID of the one or more CG occasion IDs is based at least in part on an end symbol in an associated start and length indicator version.

6. The UE of claim 1, wherein each respective CG occasion ID of the one or more CG occasion IDs is based at least in part on a quantity of symbols in an associated start and length indicator version.

7. The UE of claim 1, wherein each respective CG occasion ID of the one or more CG occasion IDs is based at least in part on a frequency of a start resource block in an associated frequency domain resource allocation.

8. The UE of claim 1, wherein each respective CG occasion ID of the one or more CG occasion IDs is based at least in part on a frequency of an end resource block in an associated frequency domain resource allocation.

9. The UE of claim 1, wherein each respective CG occasion ID of the one or more CG occasion IDs is based at least in part on a quantity of resource blocks in an associated frequency domain resource allocation.

10. The UE of claim 1, wherein each respective CG occasion ID of the one or more CG occasion IDs is based at least in part on an index of a time domain resource allocation (TDRA) among multiple TDRAs of CG-PUSCH occasions configured for an associated CG configuration.

11. The UE of claim 1, wherein the one or more processors, to generate the message, are configured to select the one or more CG occasion IDs from among multiple candidate CG occasion IDs for a first CG configuration that are different than multiple candidate CG occasion IDs for a second CG configuration.

12. The UE of claim 11, wherein the multiple candidate CG occasion IDs for the first CG configuration are contiguous in number, and wherein the multiple candidate CG occasion IDs for the second CG configuration are contiguous in number.

13. The UE of claim 11, wherein a candidate CG occasion ID for the first CG configuration in a CG-PUSCH occasion and a candidate CG occasion ID for the second CG configuration in the CG-PUSCH occasion are contiguous in number.

14. The UE of claim 1, wherein the message includes, for each CG-PUSCH occasion time slot in a sequence of CG-PUSCH occasion time slots, a bit or a codepoint that indicates a respective CG occasion ID of the one or more CG occasion IDs.

15. The UE of claim 1, wherein each respective CG occasion ID of the one or more CG occasion IDs indicates whether more than one CG-PUSCH occasion of the multiple CG-PUSCH occasions that overlap in time in the respective time slot for the respective CG occasion ID are unused or not unused.

16. The UE of claim 1, wherein each CG-PUSCH occasion of the multiple CG-PUSCH occasions that overlap in time in a respective time slot associated with a respective CG occasion ID is identified by a sub-ID, and wherein the message includes one or more sub-IDs with each CG occasion ID to indicate the one or more unused CG-PUSCH occasions and the one or more not unused CG-PUSCH occasions in the respective time slot.

17. The UE of claim 1, wherein the message includes a sub-ID that indicates that all of the multiple CG-PUSCH occasions associated with a CG occasion ID are unused.

18. The UE of claim 1, wherein the one or more CG occasion IDs include a CG occasion ID associated with a last not unused CG-PUSCH occasion time slot in a CG period, and wherein all CG-PUSCH occasion time slots of the CG period prior to the last not unused CG-PUSCH time slot are not unused.

19. The UE of claim 18, wherein the UE is configured to use one or more default CG-PUSCH occasions in each of the CG-PUSCH occasion time slots of the CG period prior to the last not unused CG-PUSCH time slot.

20. The UE of claim 18, wherein the message includes one or more sub-IDs with the CG occasion ID that indicate CG-PUSCH occasions that are unused and CG-PUSCH occasions that are not unused in the last not unused CG-PUSCH time slot.

21. A method of wireless communication performed by a user equipment (UE), comprising:

generating a message that indicates, with one or more configured grant (CG) occasion identifiers (IDs), one or more unused CG physical uplink shared channel (PUSCH) occasions and one or more not unused CG-PUSCH occasions, each respective CG occasion ID of the one or more CG occasion IDs being associated with a respective time slot in which multiple CG-PUSCH occasions overlap in time; and transmitting the message, wherein the multiple CG-PUSCH occasions of each respective time slot include a first CG-PUSCH occasion that overlaps with a second CG-PUSCH occasion, wherein a start and length indicator version (SLIV) of the first CG-PUSCH occasion and an SLIV of the second CG-PUSCH occasion are the same, and wherein one or more of:

a start resource block (RB) of the first CG-PUSCH occasion and a start RB of the second CG-PUSCH occasion are different, or an end RB of the first CG-PUSCH occasion and an end RB of the second CG-PUSCH occasion are different.

* * * * *